United States Patent
Nishimura et al.

[11] Patent Number: 6,044,642
[45] Date of Patent: Apr. 4, 2000

[54] DIRECT FUEL INJECTION ENGINE

[75] Inventors: Hirofumi Nishimura; Hiroyuki Yamashita; Youichi Kuji; Noriyuki Ota, all of Hiroshima, Japan

[73] Assignee: Mazda Motor Corporation, Hiroshima-Ken, Japan

[21] Appl. No.: 09/014,975

[22] Filed: Jan. 28, 1998

[30] Foreign Application Priority Data

Jan. 30, 1997 [JP] Japan ..................................... 9-017196

[51] Int. Cl.$^7$ ....................................................... F01N 3/00
[52] U.S. Cl. ................................ 60/285; 60/284; 60/277; 60/286; 123/295
[58] Field of Search ............................ 60/285, 286, 284, 60/277, 276; 123/295

[56] References Cited

U.S. PATENT DOCUMENTS

| | | | |
|---|---|---|---|
| 5,357,928 | 10/1994 | Ohtsuka | 123/424 |
| 5,642,705 | 7/1997 | Morikawa et al. | 123/300 |
| 5,729,971 | 3/1998 | Matsuno et al. | 60/277 |
| 5,806,482 | 9/1998 | Igarashi et al. | 123/259 |

FOREIGN PATENT DOCUMENTS 8-193536   7/1996   Japan .

*Primary Examiner*—Thomas Denion
*Assistant Examiner*—Binh Tran
*Attorney, Agent, or Firm*—Nixon Peabody LLP; Donald R. Studebaker

[57] ABSTRACT

A direct injection engine including, an ignition plug projected into a combustion chamber, an injector for injecting a fuel directly into the combustion chamber, a catalyst provided in an exhaust gas passage for cleaning an exhaust gas, a temperature senisor for detecting a coolant temperature condition of the catalyst, a control unit, for receiving signals from the sensor to determine that the catalyst is lower than an activation temperature when the engine coolant temperature is lower than a predetermined value, for calculating a fuel injection timing and fuel injection amount from the injector to form a fuel rich combustion gas mixture around the ignition plug equivalent to or richer than a combustion as mixture having a theoretical air fuel ratio and a fuel lean combustion as mixture leaner than the combustion as mixture having the theoretical air fuel ratio in an area surrounding said area of the fuel rich combustion gas mixture when it is determined that the temperature of the catalyst is lower than an activation temperature, and, for producing signals to the injector to inject the fuel at the fuel injection timing. The emission performance of the exhaust gas is improved. The warming up of the catalyst as well as the engine is facilitated.

38 Claims, 9 Drawing Sheets

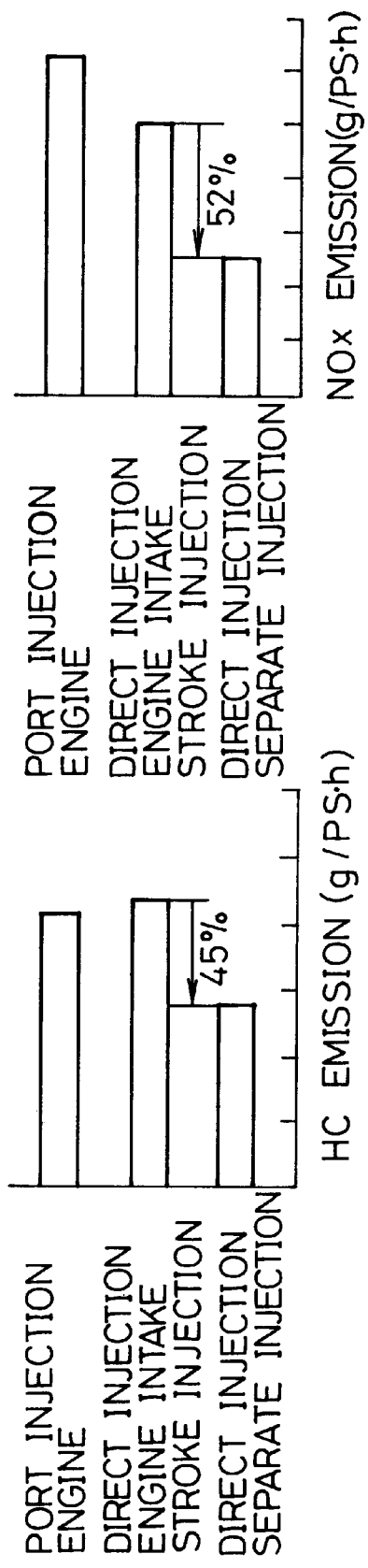
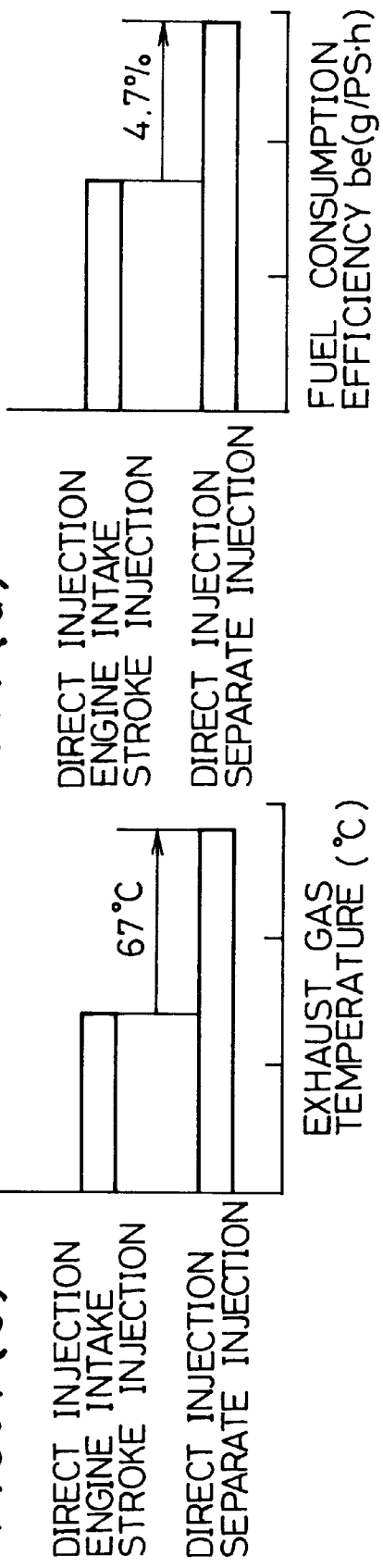

DIRECT FUEL INJECTION ENGINE

BACKGROUND OF THE INVENTION

1. Field of the Invention

The present invention relates to a direct fuel injection engine provided with a fuel injector which injects a fuel directly into an engine combustion chamber.

2. Related Art

Conventionally, there has been known a direct fuel injection engine provided with a fuel injector which injects a fuel directly into a combustion chamber. In such an engine, a fuel injection is made in a later stage of a compression stroke in a low engine load so that an air fuel mixture is concentrated around an ignition plug so as to accomplish so called a stratification combustion. Consequently, a combustion stability can be obtained while an air fuel ratio or air fuel mixture is kept fuel lean to thereby improve a fuel consumption efficiency.

Further, for instance, as shown in Japanese Patent un-examined publication No. 8-193536, it has been proposed that a separate injection in which a fuel is injected is made in both intake and compression strokes is performed in an engine starting condition, or cranking condition to disperse the air fuel mixture for transmitting the fire in the combustion chamber through the intake stroke injection and to form a combustible air fuel mixture around an ignition plug through the compression stroke injection.

Meanwhile, it is necessary for an automotive engine to improve an emission performance in which a production and an emission of harmful substances, such as HC, CO, and NOx contained in an exhaust gas is suppressed as low as possible.

For this purpose, it has been conventionally done that a catalyst is disposed in an exhaust passage to clean the exhaust gas. As the catalyst, three component catalyst has been generally known to clean HC, CO and NOx in the vicinity of a theoretical air fuel ratio. In addition, a catalyst has been developed to clean NOx in a lean burn operating condition in which a stratification combustion is established.

However, it should be noted that the exhaust gas cleaning catalyst is not able to clean the exhaust gas sufficiently in a cold condition where a catalyst temperature is lower than an activating temperature thereof. Consequently, a lot of HC (and CO) or NOx would be emitted under such condition. Therefore, it is required to reduce the emission of HC and NOx in such cold condition as well as to facilitate a warm up of the engine.

Meanwhile, where the compression stroke injection is made under the cold condition so that the air fuel mixture is controlled to a lean condition to establish the stratification combustion condition in the direct injection engine, it is disadvantageous in that a heat efficiency is facilitated while a warming up of the catalyst is delayed due to the fact that the heat amount supplied to the exhaust system is reduced.

In addition, in the injection system disclosed in the above publication, the separate injection is carried out in the starting condition. This is done for improving a starting performance and not for the emission performance during the cold condition nor for the warming up of the catalyst. Further, due to the intake stroke and compression stroke injections during the starting condition, the injected fuel would adhere to the ignition plug to deteriorate the ignition performance.

In view of this, it would be proposed that the catalyst is disposed close to the engine body, for example, the catalyst is directly connected to the engine body. However, this might deteriorate the catalytic performance due to an undue increase of the temperature of the catalyst during a high speed and high load engine condition in which the exhaust gas temperature is increased. In order to deal with this, the fuel is overly supplied than an air fuel ratio for a desirable output to reduce the exhaust gas temperature by a latent heat of the fuel. As a result, the fuel consumption efficiency during the high speed condition would be deteriorated.

In order to improve the fuel consumption efficiency, it is necessary to dispose the catalyst sufficiently away from the engine body not to unduly increase the catalyst temperature without establishing the over rich air fuel mixture in the high speed and high load condition. However, this would increase a time period before the temperature of the catalyst is sufficiently warmed up after the engine start. Therefore, it is important to improve the emission performance and facilitate the warming up of the catalyst the time period.

SUMMARY OF THE INVENTION

Therefore, an object of the invention is to provide a direct injection engine which can reduce an emission of HC, NOx and the like during the cold condition of the catalyst as well as can facilitate the warming up of the catalyst.

The above and other objects of the present invention can be accomplished by a direct injection engine comprising; an ignition plug projected into a combustion chamber, an injector for injecting a fuel directly into the combustion chamber, a catalyst provided in an exhaust gas passage for cleaning an exhaust gas, a temperature condition judging means for judging a temperature condition of the catalyst, a fuel supply means for forming a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture by means of the injector when the temperature of the catalyst is lower than an activation temperature based on the judgment of the temperature condition judging means.

In a preferred embodiment, the fuel supply means is actuated to form the fuel rich combustion gas mixture around the ignition plug equivalent to or richer than the combustion gas mixture having the theoretical air fuel ratio by injecting the fuel from the injector in a compression stroke when the temperature of the catalyst is lower than an activation temperature based on the judgment of the temperature condition judging means and to form a fuel lean combustion gas mixture leaner than said combustion gas mixture of the theoretical air fuel ratio in said area surrounding said area of the fuel rich combustion gas mixture by another fuel supply.

In this case, the air fuel ratio of the combustion gas mixture in the combustion chamber is maintained at substantially the theoretical air fuel ratio as a whole. Typically, the fuel supply means executes a separate injection in which the fuel is injected from the injector directly into the combustion chamber in both an intake stroke and combustion stroke respectively. In this case preferably, a fuel injection rate is determined such that an injection fuel amount in the intake stroke is greater than that in the compression stroke. The fuel injection rate of the fuel injection amount in the intake stroke is increased as an engine load is increased.

The direct injection engine, may preferably, comprises an ignition timing control means for retarding the ignition timing from a base ignition timing when the separate injection is executed in the case where the catalyst is in a cold condition in which the catalyst temperature is lower than the activation temperature.

In a preferred embodiment, the ignition timing is retarded in a very low engine load condition, such as an engine idling condition and in the cold condition of the catalyst, and wherein the separate injection is executed with an increased supply of an amount of air and fuel which is greater than those corresponding to an engine operating condition.

The retardation of the ignition timing and the increased supply of the air and fuel may be canceled when the engine load is increased from the very low engine load condition to a predetermined engine load condition. The retardation of the ignition timing may be reduced when a running condition is established.

Preferably, the separate injection is executed where the catalyst is in a cold condition where the catalyst temperature is lower than the activation temperature, and only an intake stroke injection is executed after the catalyst is warmed up. Alternatively, only a compression stroke injection may be executed after the engine is warmed up. The separate injection may be executed where the catalyst is in a cold condition where the catalyst temperature is lower than the activation temperature, and wherein only a compression stroke injection is executed after the catalyst is warmed up. Preferably, the compression stroke injection may be executed in a range of BTDC 50°–60° CA. The intake stroke injection, preferably, is executed in a range of ATDC 70° 20° CA. A cavity of a concave configuration is formed on a top portion of a piston which partly define the combustion chamber so that an injected fuel through the compression stroke injection is reflected on the cavity surface to stay around the ignition plug. In a preferred embodiments, the temperature condition judging means infers the temperature of the catalyst based on an engine coolant temperature to determine that the temperature of the catalyst is lower than the activation temperature when the engine coolant temperature is lower than a predetermined value.

The fuel supply means may be actuated to form the fuel rich combustion gas mixture around the ignition plug and a fuel lean combustion gas mixture in the area surrounding said area of the fuel rich combustion gas mixture after an engine starting operation is completed.

In another aspect of the invention, the fuel supply means forms a fuel rich combustion gas mixture around the ignition plug equivalent to or richer than a combustion gas mixture having a theoretical air fuel ratio and a fuel lean combustion (gas mixture leaner than the combustion gas mixture having the theoretical air fuel ratio in an area surrounding said area of the fuel rich combustion gas mixture by means of the injector when the engine is in a cold condition.

In a further aspect of the present invention, a direct injection engine comprises an ignition plug projected into a combustion chamber, an injector for injecting a fuel directly into the combustion chamber, a catalyst provided in an exhaust gas passage for cleaning an exhaust gas, a temperature condition judging means for judging a temperature condition of the catalyst, a fuel supply means for forming a fuel rich combustion gas mixture around the ignition plug equivalent to or richer than a combustion gas mixture having a theoretical air fuel ratio including an excessive fuel not to be combusted at an initial combustion stage in the combustion chamber and a fuel lean combustion gas mixture leaner than the combustion gas mixture having the theoretical air fuel ratio in an area surrounding said area of the fuel rich combustion gas mixture so as to reduce the combustion speed at a main combustion stage following the initial combustion stage by means of the injector when the temperature of the catalyst is lower than an activation temperature based on the judgment of the temperature condition judging means, whereby the excessive fuel is combusted in a late combustion stage following the main combustion stage. In further aspect of the present invention, a direct injection engine comprises an ignition plug projected into a combustion chamber, an injector for injecting a fuel directly into the combustion chamber, a catalyst provided in an exhaust gas passage for cleaning an exhaust gas, a temperature sensor for detecting a coolant temperature condition of the catalyst, and a control unlit for receiving signals from the sensor to determine that the catalyst is lower than an activation temperature when the engine coolant temperature is lower than a predetermined value, for calculating a fuel injection timing and fuel injection amount from the injector to form a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture when it is determined that the temperature of the catalyst is lower than an activation temperature, and, for producing signals to the injector to inject the fuel at the fuel injection timing. In this case, a control unit may receive signals from the sensor to determine that the catalyst is lower than an activation temperature when the engine coolant temperature is lower than a predetermined value, calculate a first fuel injection timing and first fuel injection amount from the injector to form a fuel rich combustion gas mixture around the ignition plug equivalent to or richer than a combustion gas mixture having a theoretical air fuel ratio and calculates a second fuel injection timing and second fuel injection amount from the injector to form a fuel lean combustion gas mixture leaner than the combustion gas mixture having the theoretical air fuel ratio in an area surrounding said area of the fuel rich combustion gas mixture when it is determined that the temperature of the catalyst is lower than an activation temperature, and, for producing signals to the injector to inject the fuel at the fuel injection timings respectively.

In this case, the first fuel injection timing may set at a compression stroke and the second fuel injection timing is set at an intake stroke. Preferably, a total amount of the first and second fuel injections provide a combustion gas mixture having the theoretical air fuel ratio in the combustion chamber as a whole.

Further objects, features and advantages of the present invention will become apparent from the Detailed Description of Preferred Embodiments which follows when read in light of the accompanying Figures.

BRIEF DESCRIPTION OF THE DRAWINGS

FIG. 7 is a graphical representation showing comparative data of intake stroke injection and separate injection for a port injection engine and direct injection engine, (a) is HC emission, (b) is NOX emission, (c) is the exhaust gas temperature, (d) fuel consumption efficiency;

DETAILED DESCRIPTION OF THE PREFERRED EMBODIMENTS

Figure 1:
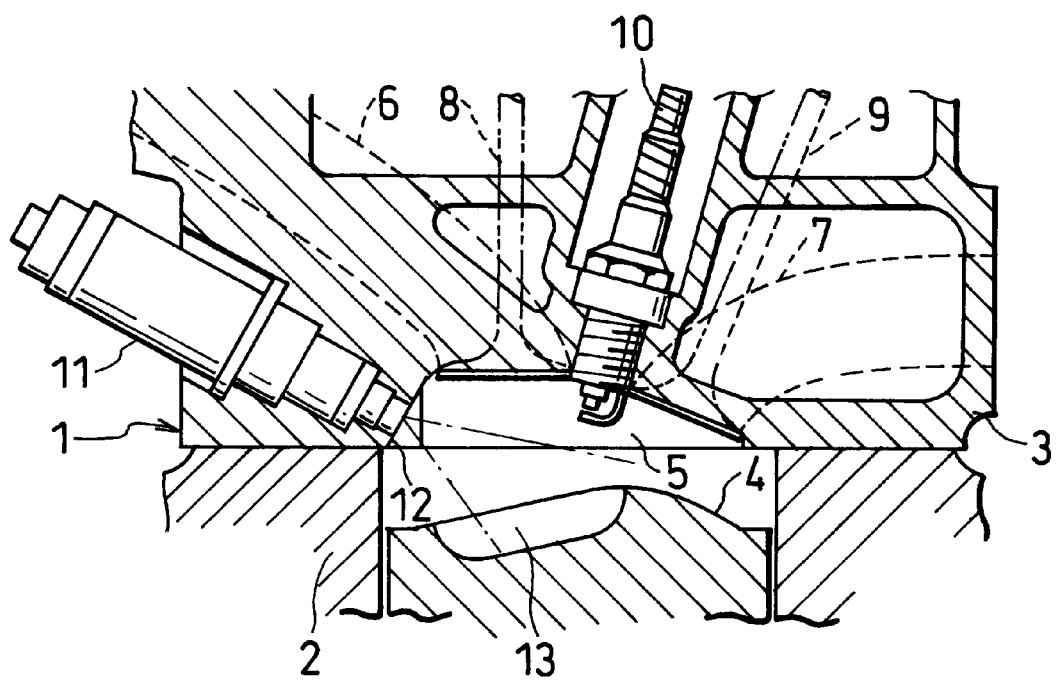
FIG. 1 is a sectional view of a direct injection engine body according to the present invention.

Hereinafter, the present invention is described in detail taking reference with the attached drawings. FIG. 1 shows a structure of a combustion chamber of the direct injection engine. The engine illustrated in FIG. 1 is provided with an engine body 1 constituted by a cylinder block 2, cylinder head 3 and the like. The engine body is formed with a plurality of cylinders in which pistons 4 are disposed respectively. Between a top surface of the cylinder and a lower surface of the cylinder head 3 is formed a combustion chamber 5 for which an intake port 6 and exhaust port 7, intake valve 8 and exhaust valve 9 for opening and closing the ports 6 and 7 and an ignition plug 10. In addition, an injector 11 is disposed so as to inject a fuel directly into the combustion chamber 5.

The lower surface of the cylinder head 3 is formed with a certain configuration of a recess for defining a part of the combustion chamber 5. For example, the recess of a trapezoid may define a part of the combustion chamber 5 as illustrated. The intake port 6 is opened in an upper portion of the chamber 5 and the exhaust port 7 is opened in a slant surface portion of the chamber 5. Although each one of the intake port and the exhaust port are illustrated, there are preferably provided a pair of the intake and exhaust ports side by side in a direction perpendicular to the sectioned plane of FIG. 1. The intake and the exhaust ports 6 and 7 are provided with the intake valve 8 and the exhaust valve 9 which are driven by a valve driving mechanism (not shown) with a predetermined timing.

The ignition plug 10 is mounted on the cylinder head 3 to be located at a central portion of the chamber 5 in a manner that an ignition gap is oriented and projected into the chamber 5. The injector 11 is disposed in a peripheral portion of the chamber 5. In the illustrated embodiment, the injector 11 is mounted at one side of the intake port 6 in the chamber 5. A tip end of the injector 11 is oriented to a wall surface portion 12 between the upper end surface of the chamber 5 and a connection surface with the cylinder block 2 and is adapted to inject the fuel obliquely downwardly. Further, a cavity 13 is formed at a top of the piston which defines a bottom of the chamber i as illustrated. In this configuration, a relationship between the position and orientation of the injector 11, the position of the cavity 13 and the ignition plug 10 is predetermined so that the fuel is injected toward the cavity 13 at the later stage of the compression stroke when the piston is close to an upper dead point to hit against the cavity 13 and reach in the vicinity of the ignition plug 10.

Figure 2:
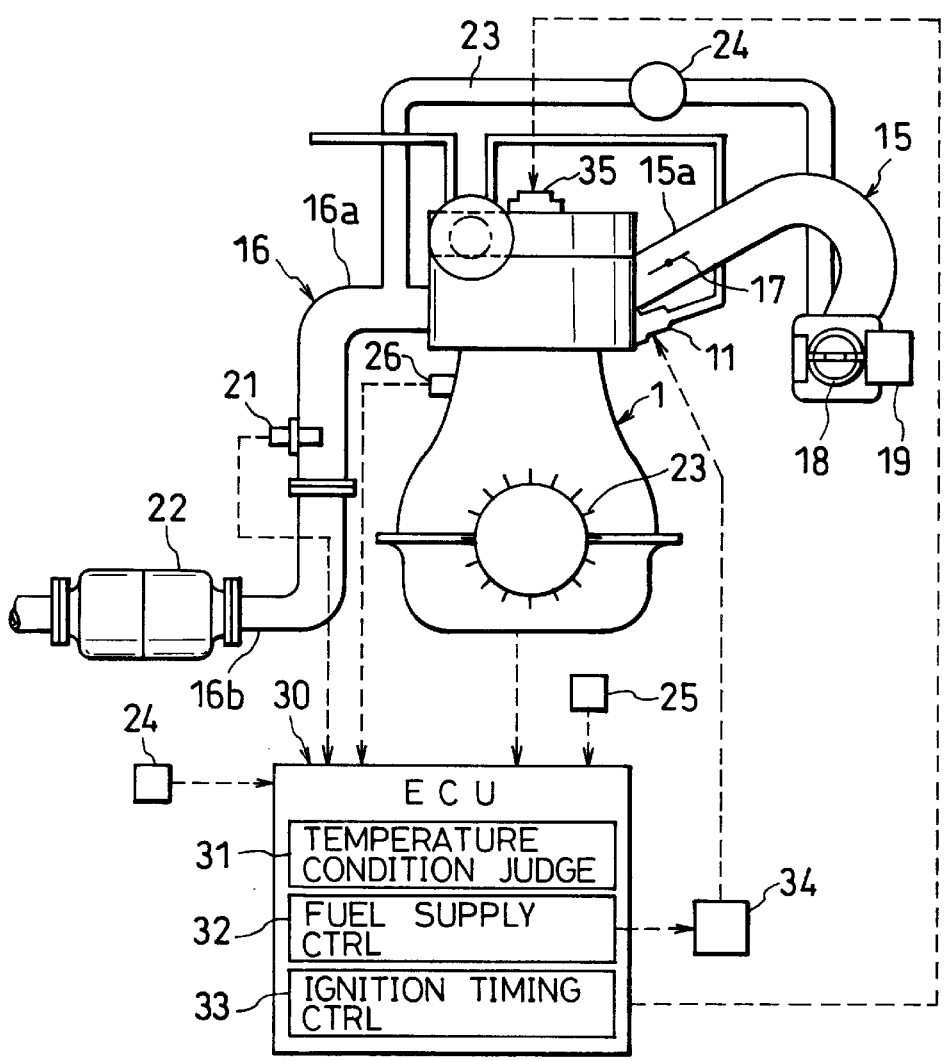
FIG. 2 a schematic view of an engine as a whole.

FIG. 2 shows schematically the engine as a whole including the intake and exhaust system wherein an intake and exhaust passages 15 and 16 are connected to the engine body 1. A downstream side of the intake passage 15 is divided into cylinder passages for the respective cylinders at an intake manifold. The cylinder passage 15a is divided into a pair of passages (one of which is shown) in parallel. The downstream sides of the passages constitute a pair of intake ports 7 are open to the chamber 5. A intake stream control valve 17 is provided in one of the intake ports 7. When the control valve 17 is closed, a swirl is formed by the intake gas introduced through the other intake port. In the intake passage 15 is disposed a throttle valve 18 which is driven by an electrical actuator 19, such as a step motor so as to control an amount of the intake air.

On the other hand, in the exhaust passage 16 is disposed an oxygen sensor 21 ($O_2$ sensor) for sensing the air fuel ratio of the exhaust gas and a catalytic device 22 including a catalyst for cleaning the exhaust gas.

Although the catalytic device may be constituted by a three component catalyst, it is desirable to employ a catalyst which can clean NOx under the air fuel ratio leaner than the theoretical air fuel ratio so as to improve the cleaning performance in the stratification combustion gas mixture condition after the warming up operation as described hereinafter.

In detail, the conventional three component catalyst exerts the cleaning performance for all of HC, CO, NOx in the vicinity of the theoretical air fuel ratio. Recently, a catalyst which cleans NOx even under a leaner condition than the theoretical air fuel ratio condition in addition to the cleaning performance of the three component catalyst.

If the catalytic device is directly connected with the exhaust manifold 16a, the catalyst temperature would be unduly heated in the high speed and high engine load condition. Thus, the catalytic device 22 is disposed in a half way of the exhaust tube 16b which is connected with the exhaust manifold. The exhaust passage 16 and the intake passage 15 is connected by an EGR passage 23 in which an EGR valve 24 is intervened.

An engine control valve (ECU) 30 is provided for controlling the engine. The ECU receives signals from a crank angle sensor 23 for sensing a crank angle, an acceleration sensor 24 for sensing an acceleration pedal stroke, an air flow meter 25 for sensing an amount of the intake air, a water temperature sensor 26 for sensing a water temperature and the $O_2$ sensor 21.

The ECU includes a temperature condition judging means 31, fuel supply control means 32 and an ignition timing control means 32. The temperature condition judging means 31 infers the temperature condition of the catalyst based on the water temperature signal from the water temperature sensor 26 to judge whether or not the catalyst temperature is lower than the activating temperature. The temperature condition judging means 31 judges that the catalyst is in the cold condition when the water temperature is lower than a first predetermined temperature and that it is in the warmed up condition when the water temperature is not lower than that temperature. In addition, the temperature condition judging means 31 infers the engine temperature condition to judge that the engine is in the cold condition if the water temperature is lower than a second predetermined temperature and if not, the engine is in the warmed up condition. Usually, the second predetermined temperature is greater than the first predetermined temperature. Alternatively, the temperature condition judgment for judging the warmed up condition of the catalyst may be made based on the water temperature or a time period from the engine start, or by sensing the catalyst temperature directly.

The fuel supply control means 32 controls the injection timing and the injection amount from the injector 11 through an injector drive circuit 34. The control means 32 controls the air fuel ratio of the combustion gas mixture in the chamber 5 as a whole at the theoretical value during the catalyst cold condition. In this case, the fuel is separately injected at an early stage of the intake stroke and the later stage of the compression stroke so as to form a fuel rich gas mixture equivalent to or richer than the theoretical air fuel ratio around the ignition plug 10 and to form a leaner gas mixture than the theoretical one beyond the area of the richer gas mixture.

The ignition timing control means 33 produces a control signal to the igniter 33 to control the ignition timing in accordance with the engine operating condition wherein the ignition timing is basically controlled to MBT and retarded in the catalyst cold condition and low engine load condition, when necessary.

The ECU 30 controls the intake gas amount by producing the control signal to the actuator 19 for driving the throttle valve 18. The ECU controls the intake air amount to form a leaner gas mixture condition than the theoretical air fuel condition when the stratification combustion gas mixture condition is made by a fuel injection only in the compression stroke after the warming up condition and the like. As described later, when the ignition timing is retarded during the catalyst cold condition and low engine load condition, the ignition, the intake gas amount and the fuel injection amount are increased. The ECU 30 controls the intake gas stream control valve 17 to form the swirl in the chamber 5 during the separate fuel injection and controls the EGR valve 24 to carry out the EGR when the stratification combustion gas mixture condition under the leaner air fuel ratio condition is executed.

Figure 3:
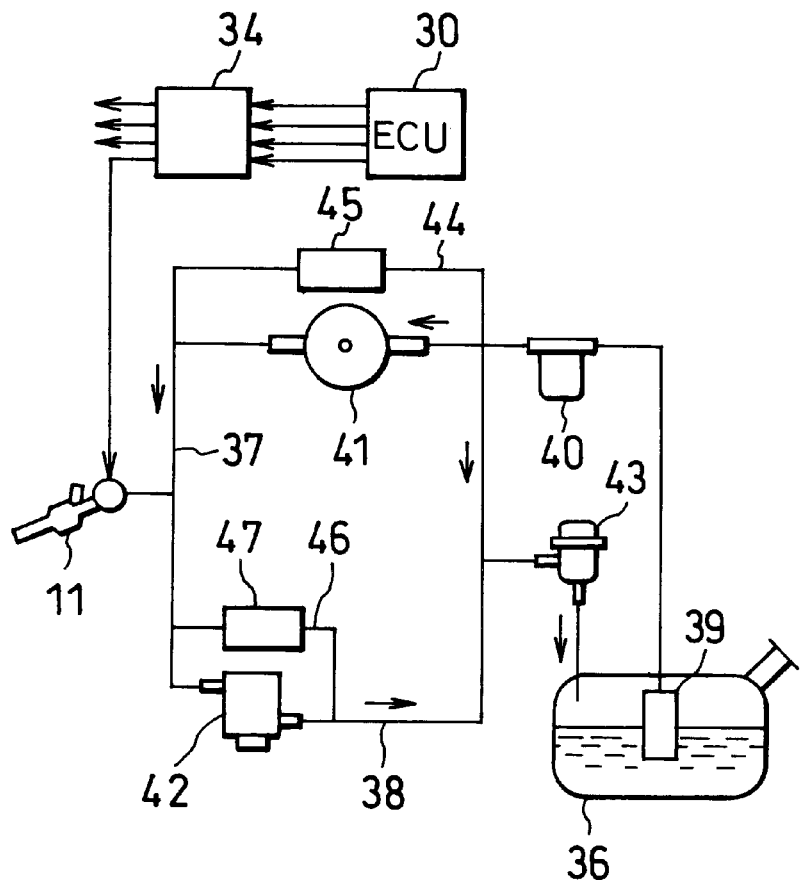
FIG. 3 is a schematic view of a fuel supply system for the direct injection engine according to the present invention.

FIG. 3 shows a preferred embodiment of a fuel system. There are provided a fuel supply passage 37 and fuel return passage 38 between the injector 11 and a fuel tank 36. In the supply passage 37 are disposed a low pressure fuel pump 39, filter 40 and high pressure fuel pump 41 driven by the engine following the fuel tank 36. In the fuel return passage 38 are provided a high pressure regulator 42 and a low pressure regulator 43 positioned downstream of the regulator 42. In addition, there is provided a bypass passage 44 for bypassing the high pressure fuel pump 41 and a bypass passage 46 for bypassing the high pressure regulator 42. In the passage 46 is provided a solenoid valve 47. Usually, when the solenoid valve 47 is closed, the high pressure fuel pump 41 is driven and the high pressure regulator 42 is operated to control a fuel pressure applied to the injector 11 to a fuel pressure which is high enough to be injected at the later stage of the compression stroke. In the engine starting condition where the high pressure fuel pump 41 is not operated in a good condition, the low pressure fuel pump 39 is driven and the solenoid valve 47 is opened to bypass the high pressure regulator 42 and thus the low pressure regulator 43 is activated. As a result, the fuel pressure applied to the injector 11 is controlled to a low value suitably applicable to the intake stroke injection.

Figure 4:
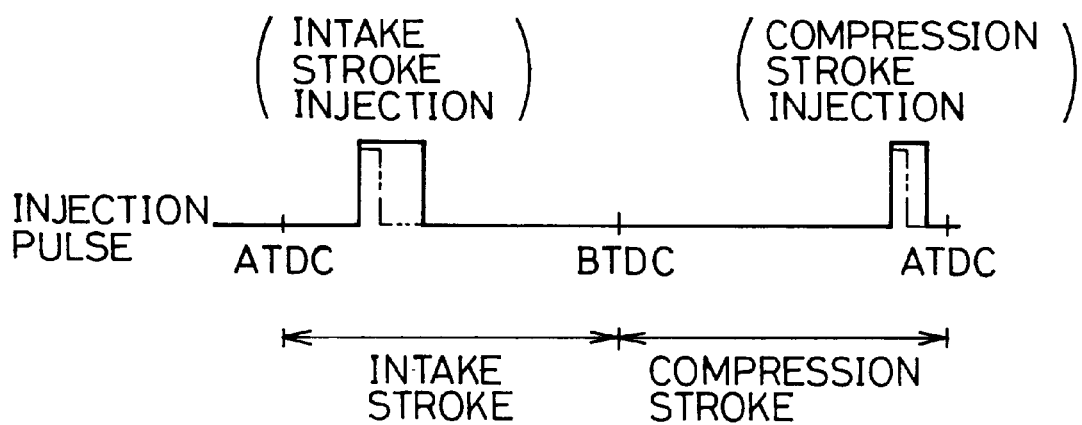
FIG. 4 is a time chart showing injection pulses in an intake stroke injection and compression stroke injection when a separate injection is executed.

FIG. 4 shows an injection timing where the fuel injection is executed in the manner of the separate injection by means of the injector 11. The separate injection is constituted by the intake stroke injection and the compression stroke injection as shown in FIG. 1. In case of the illustrated configuration of the combustion chamber 5, the compression stroke injection is executed at the later stage of the compression stroke in which the piston approaches to the upper dead canter and the fuel injected from the injector 11 is sprayed into the cavity 13 of the top of the piston 4. In particular, the fuel injection is preferably started at a timing during about 50°–60° CA (before the compression stroke top dead center crank angle). On the other hand, the intake stroke injection is executed at the early stage of the intake stroke, preferably at a timing when the piston 4 moves away from the top dead center so as to divert the injected fuel from the cavity 13. Considering a suppression of the adherence of the injected fuel on the cylinder wall, about ATDC 70° CA is preferable and a range of ATDC 70°, crank angle 20° would be effective.

Hereinafter, there is described a preferred embodiment of an injection control for a direct fuel injection engine taking a reference with a time chart in FIG. 5.

Figure 5:
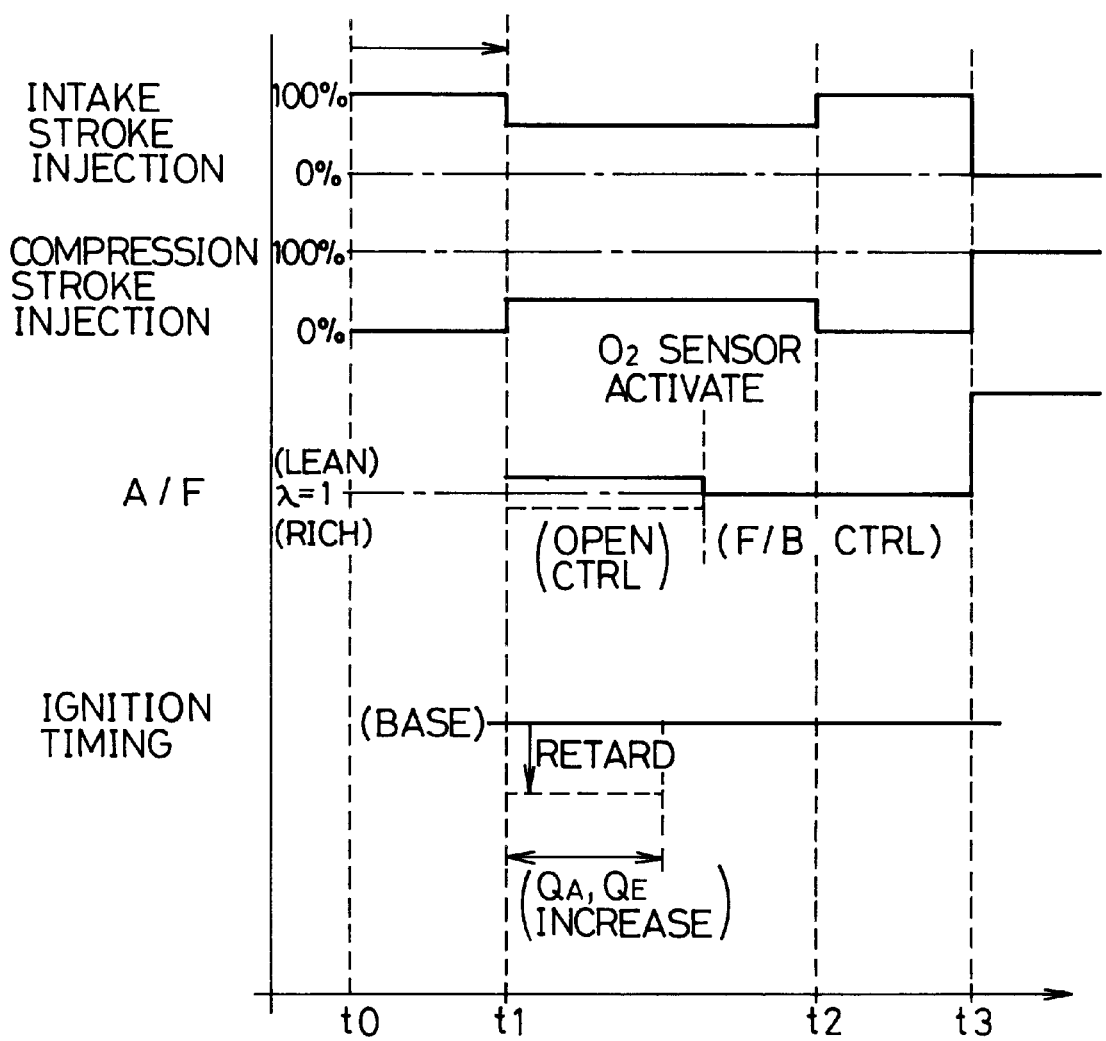
FIG. 5 is a time chart showing an example of a control pattern of the ignition timing and air fuel ratio.

In FIG. 5, the reference to designates an initial point of the engine starting operation and t1 denotes an end point of the engine starting operation. The fuel injection from the injector 11 is made only at the intake stroke during the engine starting operation. This is because a misfire would occur due to the fact that the ignition plug gets wet by the injected fuel without being well vaporized nor atomized if the fuel injection is executed at the compression stroke. In this regard, the fuel injection during the intake stroke is advantageous in that the injected fuel can get an enough time to be vaporized and atomized. In addition, the high pressure fuel pump is not operated in good condition in the starting condition. Therefore, in the illustrated fuel system in FIG. 3, the injection fuel pressure is low and can afford only the intake stroke injection during the engine starting operation.

When the catalyst and engine are in the cold condition after the end point $t_1$ of the starting operation, the separate injection is executed, namely, the fuel is injected from the injector 11 in both the intake and compression strokes. The air fuel ratio is controlled to substantially the theoretical value ($\lambda \approx 1$) in the combustion chamber 5 as a whole during the separate injection. In this case, a predetermined ratio of the total amount of the fuel is injected in the early stage of the intake stroke and the rest of the fuel is injected in the later stage of the compression stroke.

Figure 6:
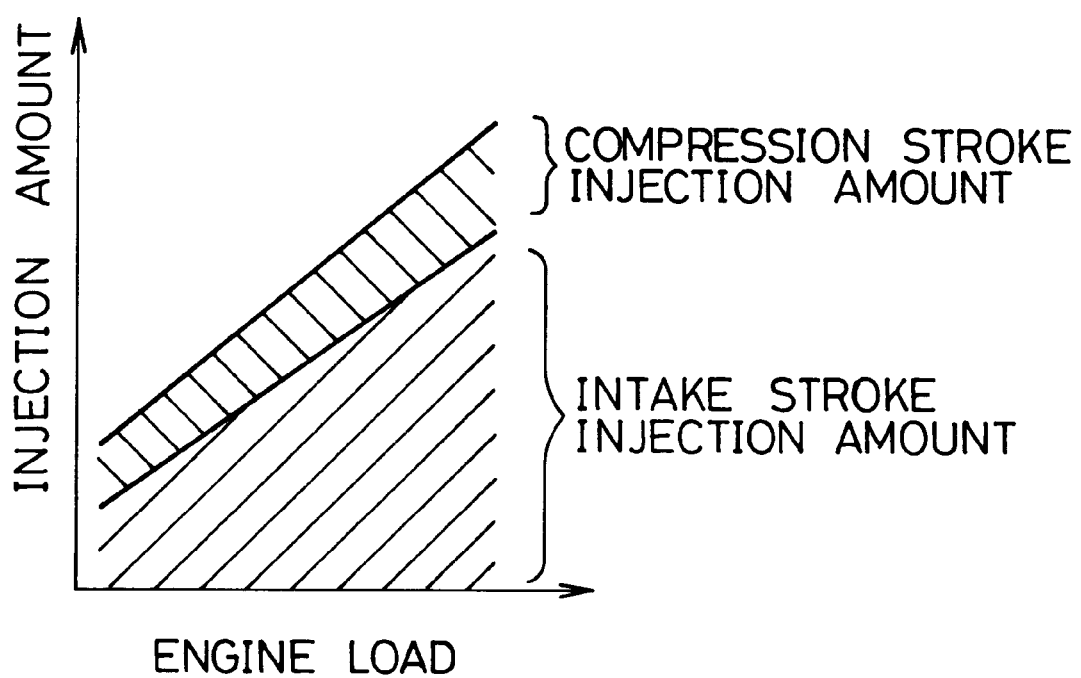
FIG. 6 is a graphical representation showing a relationship between the injection amounts in the intake stroke and compression stroke and the engine load.

In this case, the amount of the fuel injection in the intake stroke is greater than that in the compression stroke so that the fuel rich combustion gas mixture richer than those of the theoretical air fuel ratio is concentrated around the ignition plug and a fuel lean compression gas mixture exists in the area beyond the area of the fuel rich combustion gas mixture in the chamber 5. It is desirable that as the engine load is increased, the ratio of the intake stroke injection amount to the compression stroke injection amount is increased. As shown in FIG. 6, as the engine load is increased, the total amount of fuel injection is increased. In this case, the compression stroke injection amount is maintained or slightly increased while the intake stroke injection amount is increased greatly as shown in FIG. 6. The control of the total amount of the fuel injection of the injector 11 in the catalyst cold condition is executed in accordance with an open control until the $O_2$ sensor is activated and switched to a feedback control after the $O_2$ sensor is activated. Even when the open control is executed, the total amount of the fuel injection is calculated in accordance with the intake air amount so that the air fuel ratio of the combustion gas mixture in the chamber is controlled to substantially the theoretical value as a whole. However, the air fuel ratio(A/F) during the open control can be changed within a range between a rich and lean conditions, for instance between 13 and 17 if necessary. For example, a slightly lean condition is desirable to suppress HC and the like. On the contrary, a slightly rich condition is desirable to improve the combustion stability. The activation of the $O_2$ sensor can be determined by checking out whether or not an output of the $O_2$ sensor is reverted. Alternatively, it may be determined that the $O_2$ sensor is activated when a certain time period has passed after the engine start.

As for the ignition timing control during the catalyst cold condition, although the ignition timing can be maintained at a basic ignition timing such as MBT, it can be slightly retarded for a certain period after the completion of the engine starting operation. In particular, when the engine operating condition is in a very low engine load condition, such as an idling condition and where a relationship between an injection pulse witdth and the fuel injection amount cannot maintain a linear property due to the small amount of the fuel injection by executing the separate fuel injection, a sufficient pulse width of the fuel injection may not be maintained as shown by a two dot chain line in FIG. 4. In this case, it is desirable to compensate the fuel injection amount to be increased as well as retarding the ignition timing.

In order to avoid a deterioration of the fuel consumption efficiency or running performance, the retard of the ignition timing and the air and fuel increase compensation is terminated when the engine load has been increased from the very low condition to a low engine load of a certain load (which can maintain the linear relation ship between the injection pulse width and the fuel injection amount during the separate fuel injection) or more. When the vehicle is in a running operation, the retard of the ignition timing is terminated or otherwise reduced.

After the catalyst warmed up condition has been accomplished and when the engine is still in the cold condition, the fuel injection is switched from the separate injection to only the intake stroke injection. Then, after the engine warmed up condition has been accomplished, the fuel injection is switched to the compression stroke injection only to accomplish the stratification combustion gas mixture condition. In this case, the throttle valve is greatly opened to increase the intake air amount to make the combustion gas mixture lean. The switching from the separate injection to the intake stroke injection may be made with a certain time lug after the catalyst warmed up condition is accomplished. Similarly, the switching from the intake stroke injection to the compression stroke injection may be made with a certain time lug after the engine warmed up condition has been established.

When the catalyst are in the cold condition after the starting operation, the separate injection is executed in both the early stage of the intake stroke and the later stroke of the compression stroke so that the air fuel ratio is controlled to substantially the theoretical value ($\lambda \approx 1$) in the combustion chamber 5 as a whole. In this case, the fuel injected during the intake stroke injection is dispersed in the combustion chamber 5 and thus an atmosphere of a lean combustion gas mixture is formed around the ignition plug 10 leaner than the theoretical one. Then, a fuel right combustion gas mixture atmosphere richer than the theoretical one is formed around the ignition plug 10 by the injected fuel during the later stage of the compression stroke.

As a result, the amount of HC, CO and NOx exhausted from the engine to the exhaust gas passage 16 are reduced and the warming up of the catalyst is facilitated.

This will be described hereinafter taking reference with FIGS. 7(a), 7(b), 7(c) and 7(d). FIGS. 7(a) and 7(b) show results of measured amounts of HC, CO and NOx exhausted from the engine body with regard to a port injection engine in which a fuel injection from an intake port injector is made into the intake port, the direct fuel injection engine making only intake stroke injection and the direct fuel injection making the separate fuel injection. FIGS. 7(c) and 7(d) show the results of measured exhaust gas temperature and fuel consumption efficiency with regard to the direct fuel injection engine making only intake stroke injection and the direct fuel injection making the separate fuel injection. These results are based on the conditions of engine speed 1500rpm, mean effective pressure Pe=3kg/cm$^2$, and the air fuel ratio $\lambda$=1(the theoretical air fuel ratio).

Where the combustion gas mixture is richer than the theoretical mixture, the exhaust amount of HC is increased. On the contrary, where the mixture is leaner than the theoretical one, it is disadvantageous in the combustion stability and the warming up performance. In order to facilitate the cleaning performance as high as possible even before the engine is completely warmed up but when the catalyst exerts the cleaning performance to some extent, it is desirable that the air fuel ratio is maintained at the value of $\lambda$=1. In the illustrated embodiment, the catalyst begins to exert the cleaning effect to some extent in the catalyst cold condition when the separate fuel injection is executed (even before the complete warmed up condition of the catalyst) if the engine temperature is increased to a certain level. Where the three component catalyst is employed, HC, CO and NOx are removed at the condition of the theoretical air fuel ratio. As aforementioned, a new catalyst has been recently developed that can reduce NOx even under the lean fuel combustion gas mixture. Even if the new catalyst is employed, the cleaning performance for NOx under the theoretical air fuel ratio is better than the leaner condition.

As shown in FIGS. 7(a) and (b), the emission of the amounts of both HC and NOx were dramatically reduced in case of the separate injection in the direct fuel injection engine compared with the port injection type engine and the intake stroke injection of the direct fuel injection engine. Specifically, the emission of HC was reduced by approximately 45% and NOx by 50%. Further, as shown in FIG. 7(c), the separate fuel injection increased the exhaust gas temperature greatly (65° C.–70° C.) compared with the intake stroke injection.

Further as shown in FIG. 7(d), where the separate injection in the direct injection engine is executed, the fuel consumption efficiency is deteriorated compared with the intake stroke injection by about 4–5% since a part of the combustion energy of the fuel is used for increasing the exhaust gas temperature. However, this is still much better than the case where the ignition timing is retarded in order to increase the exhaust gas temperature to the same level as the separate injection.

The reason why the separate injection is effected to reduce HC and NOx emission and increase the exhaust gas temperature will be explained hereinafter. The separate injection is effected to form a relatively fuel rich combustion gas mixture ($\lambda \leq 1$) area around ignition plug 10 and a relatively fuel lean combustion gas mixture ($\lambda > 1$) area surrounding the ($\lambda \leq 1$) area as aforementioned. Considering the progress of the combustion following the firing of the mixture, the combustion mechanism is as follows:

i) Initial Combustion Stage

As aforementioned, the ignition plug is surrounded by the fuel rich combustion gas mixture ($\lambda \leq 1$). As a result, the ignition stability is improved and a combustion speed is increased in the initial stage of the combustion. As well known, the combustion speed is increased when the air fuel ratio(A/F) is in a range about 13–14.7. Under such a fuel rich combustion gas atmosphere, a production of NOx is suppressed due to a lack of excessive oxygen. On the other hand, an excessive fuel exists around the ignition plug 10 at the initial stage.

ii) Main Combustion Stage

The combustion area moves from the fuel rich ($\lambda \leq 1$) area around the ignition plug 10 to the fuel lean ($\lambda > 1$) area surrounding the fuel rich ($\lambda \leq 1$) area. The fuel lean ($\lambda > 1$) area occupies the most part of the combustion chamber 5. The combustion in the fuel lean ($\lambda > 1$) area is slow compared with that in the fuel rich ($\lambda \leq 1$) area. It is known that the combustion speed is reduced in the fuel lean gas mixture and also known that the ignition timing is advanced to deal with the reduction of the combustion speed. However, in the combustion of the illustrated embodiment, the combustion in the initial stage is fast as aforementioned. Thus, it is not necessary to advance the ignition timing.

As a result, NOx emission is reduced as well as HC emission. And the exhaust gas temperature is increased.

Due to a momentum of the fuel injection in the compression stroke, the combustion caused by the injected fuel rich mixture gas stream expands from the area around the ignition plug to the surrounding fuel lean area while the excessive fuel in the stream getting the oxygen in the surrounding fuel lean area. Thus, the concentration of the oxygen in the chamber 5 is reduced to thereby reduce the emission of NOx. Generally, the emission of NOx tends to be increased under the combustion of a fuel lean combustion gas mixture such as the air fuel ratio A/F=16–17 including an excessive oxygen. It should be understood that according the illustrated embodiment, the emission of NOx is reduced even in the combustion under the fuel lean gas mixture since the excessive fuel in the moving fuel rich gas mixture deprives the excessive oxygen in the surrounding fuel lean gas mixture to reduce the oxygen concentration.

In addition, the moving combusted gas mixture provides an internal EGR effect. This is also effected to reduce the emission of NOx. Thus, the emission of HC and NOx are reduced and the exhaust gas temperature is increased.

iii) Last Stage Combustion

As aforementioned, the excessive fuel around the ignition plug combusts expanding and depriving the oxygen in the surrounding fuel lean gas mixture area. This last stage combustion is also effected to reduce the emission of HC and increase the exhaust gas temperature.

Generally, it is believed that the reduction of the NOx is of a converse relationship with the reduction of HC and the increase of the exhaust gas temperature. According to the illustrated embodiment of the present invention, however, the reduction of the NOx is compatible with the reduction of HC and the increase of the exhaust gas temperature as aforementioned.

Figure 8:
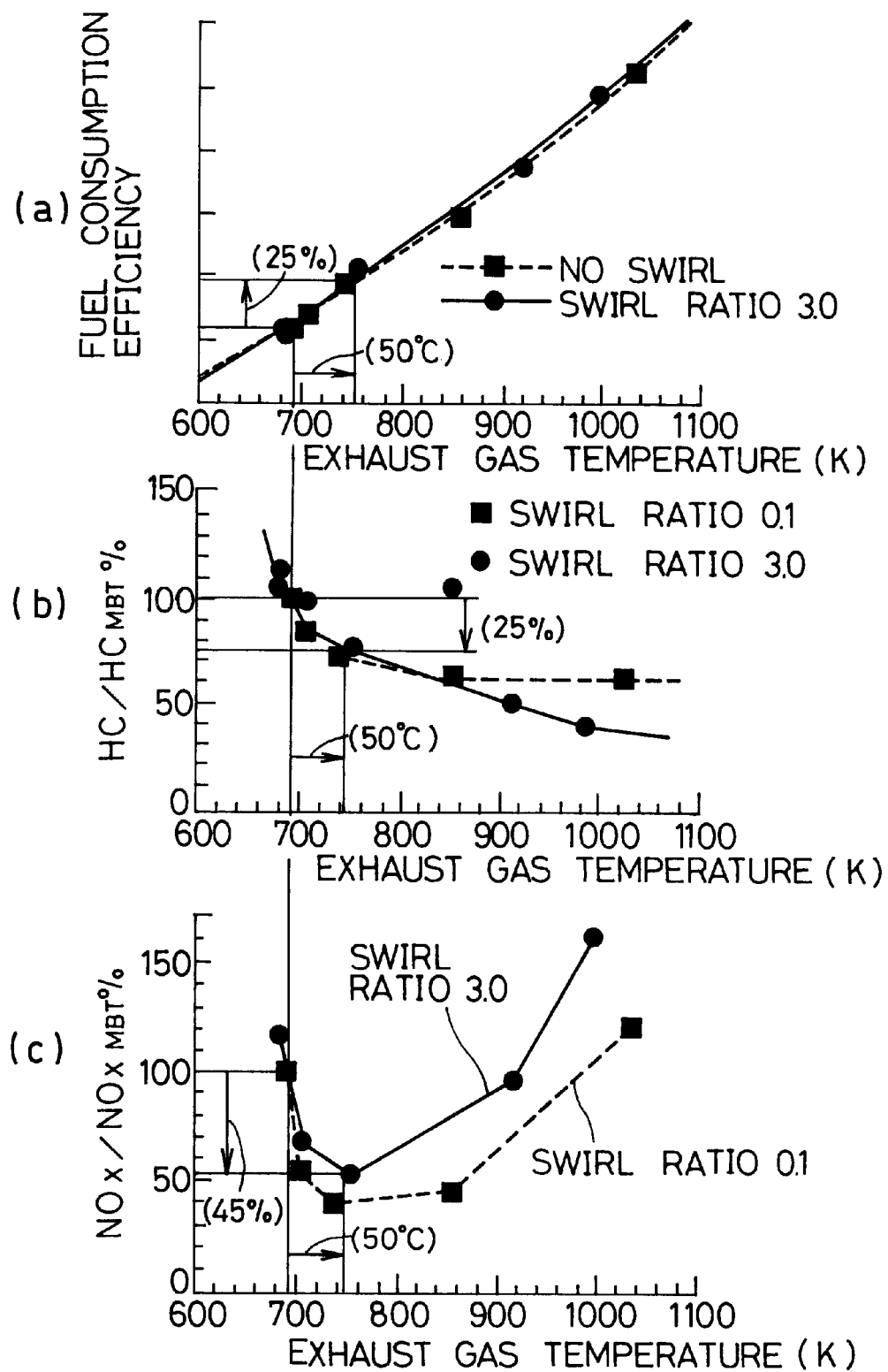
FIG. 8 is a graphical representation showing data showing changes of and the fuel consumption efficiency and the emission, (a) is fuel consumption efficiency, (b) is change rate of HC emission, (c) is the change rate of NOx emission.

Namely, although the ignition timing is retarded to increase the exhaust gas temperature and to reduce HC and NOx, the separate fuel injection is more effective to get the same result while suppressing the deterioration of the fuel consumption efficiency. FIGS. 8(a), 8(b) and 8(c) show a relationship between the increase of the exhaust gas temperature, fuel consumption efficiency, changes of HC, Nox emission. FIGS. 8(b) and 8(c) show percentages of emission amounts of HC and NOx in a certain exhaust gas temperature against emission amounts of HC and NOx when the exhaust gas temperature is about 420° C.(about 693°K.) respectively.

As it would be understood from the graphical representation of FIGS. 8(a), (b) and (c) that where the exhaust gas temperature is increased by 50° C. from the temperature 420° C. by retarding the ignition timing, the fuel consumption efficiency is deteriorated by 25% while the emission HC is reduced by 25% and NOx is reduced by 45%. On the other hand, the separate fuel injection provides the increase of the exhaust gas temperature by as much as 65–70° C. with the deterioration of the fuel consumption efficiency by as small as about 4–5% and the reduction of the emission of as much as about 45% and reduction of the emission of as much as about 50%. Thus, it would be understood that the separate injection can exert the advantageous effects on the above points compared with the ignition timing as shown in FIG. 7. Accordingly, if the separate injection is executed following after the engine starting operation where the catalyst is in the cold condition, the emission performance as seen a reduction of the emission of HC (CO) and NOx is improved even under such a condition that the cleaning effect of the catalyst is not sufficiently exerted. In addition, the increase of the exhaust gas temperature is facilitated so that the warming up of the catalyst is facilitated. As a result, the time period until the catalyst is activated can be shortened.

As aforementioned, the air fuel ratio in the whole combustion chamber is maintained at substantially the theoretical air fuel ratio. Therefore, the cleaning performance for the exhaust gas is improved even before a fully warmed up condition is established. If the ignition timing is retarded in addition to the separated fuel injection, the catalyst warming up effect can be further improved due to a synergistic effect of the retardation of the ignition timing and the separate fuel injection.

In particular, if the ignition timing is retarded and the air and fuel injection amount is compensated to be increased in the case where the engine is in the very low engine load condition, such as an idling condition, the warming up of the catalyst is facilitated and concurrently an engine torque can be effectively controlled. Generally, it is difficult to accurately control an injection amount where the target value is smaller than a predetermined lower limit. Therefore, the separate injection is executed when the engine is in the very low engine load condition, an injection pulse width would be smaller than the lower limit so that the fuel injection control will become unstable. In view of this, the fuel injection amount under such condition will be compensated to be increased so as to maintain the fuel injection amount at a level greater than the lower limit in the illustrated embodiment. The engine output torque reduction due to the retardation of the ignition timing is balanced with the torque increase due to the air and fuel injection increase and thus a required toque can be accomplished. The retardation of the ignition timing and the increase of the fuel injection in addition to the separate injection increase the exhaust gas temperature to facilitate the warming up of the catalyst.

In this case, the amount of the retardation is suppressed at a small level compared with the case where only the ignition timing retardation is made without the separate injection in order to increase the exhaust gas temperature. Thus, the fuel consumption efficiency is kept from deteriorating unduly.

In the engine structure as shown in FIG. 1, a desirable combustion gas distribution is obtained if the respective timings of the intake and compression stroke injection are determined as shown in FIG. 4. In the compression stroke injection, the injection timing is determined so that the fuel injected from the injector 11 is directed to the cavity 13 of the top of the piston 4. The injected fuel is reflected from the cavity 13 to stay around the ignition plug 10 and thus to form a fuel rich combustion gas mixture around the ignition plug 10.

On the other hand, in the intake stroke injection, the fuel injection timing is determined such that the injected fuel is not directed to the cavity 13. As a result, the injected fuel is dispersed to form a fuel lean combustion gas mixture around the ignition plug 10.

Figure 9:
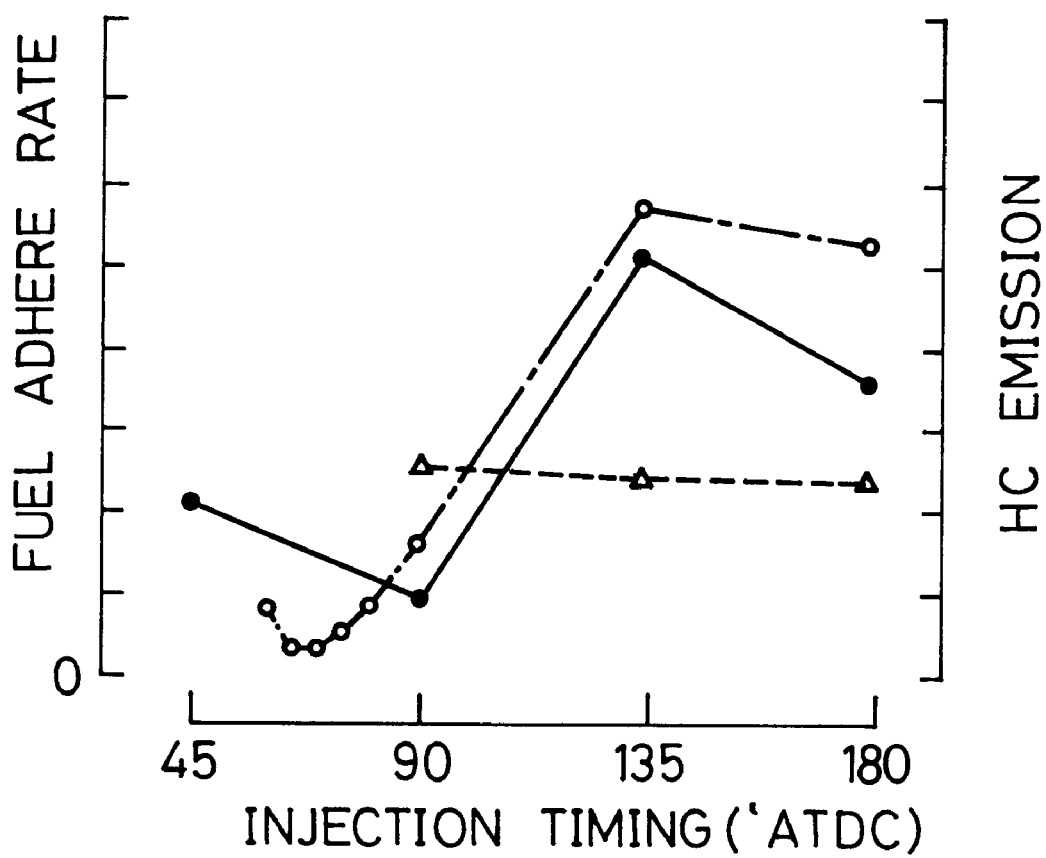
FIG. 9 is a graphical representation showing changes of a fuel amount adhered to the cylinder wall and HC emission when the timing of the intake stroke injection is changed in the direct injection engine.

FIG. 9 shows changes of the fuel rate stayed on the cylinder wall surface and the emission amount of HC when the timing of the intake stroke injection is changed. In FIG. 9, the fuel rates adhered to the wall obtained through a predetermined calculation process such as CFD (Computation Fluid Dynamics) are shown by black dots where the start timings of the injection in the intake stroke are set at ATDC 45° CA, ATDC 90° CA, ATDC 135° CA, and ATDC 180° CA respectively. White dots show the measured data of HC emission concentrations when the start timing of the intake stroke injection is changed using the engine shown in FIG. 1. The triangle dots shows the fuel rate adhered to the cylinder wall of an engine in which the the injector is arranged to inject the fuel in the central portion of the combustion chamber 5 where the start timings of the injection in the intake stroke are set at ATDC 45° CA, ATDC 90° CA, ATDC 135° CA, and ATDC 180° CA respectively. The fuel rate adhered to the cylinder wall is obtained through CFD. As seen from FIG. 9, the fuel rate adhered to the cylinder wall is not much changed even though the ignition timing is changed where the injector is arranged at the central portion of the combustion chamber 5 to injection the fuel downwardly. However, as shown in FIG. 1, if the injector 11 is arranged at the peripheral portion of the combustion chamber 5, the fuel rate adhered to the cylinder wall is changed largely so that the emission of HC is also changed. The emission of HC is minimized at around ATDC 70° CA. The reason therefor is considered as follows:

Where the fuel is injected when the piston 4 is close to the top dead center, a large amount of the fuel reflected on the top of the piston is adhered to the cylinder wall. On the other hand, where the fuel injection is made at around the ATDC 70° CA when the piston is away from the top dead center and in a down stroke. The amount of the fuel adhered to the cylinder wall is reduced due to the reduction of the fuel amount reflected on the top of the piston and as a result that the fuel is drafted downward. Further, the fuel is injected as the piston is largely away from the top dead center, the fuel amount adhered to the cylinder wall is increased again. This is because the injected fuel directly would reach the cylinder wall. Based on these data, if the fuel injection is started at around the ATDC 70° CA (at a range of the ATDC 70° CA 20° CA ), the reduction of the emission of HC is effected.

Where the swirl is produced by closing the intake stream control valve 17 during the separate injection, the combustion performance of the air fuel combustion gas mixture is improved, in particular, the combustion performance of the fuel lean combustion gas mixture formed by the intake stroke injection is improved.

According to the illustrated embodiment, only the intake stroke injection is executed with maintaining the theoretical air fuel ratio until the engine warmed up condition is established after the catalyst has been warmed up. Thus, the fuel consumption efficiency during the above condition is improved as seen from FIG. 7(d). After the catalyst has been warmed up, the emission performance is maintained at a good condition due to the cleaning effect of the activated catalyst. This operation is advantageous for facilitating the warming up compared with the operation under the fuel lean gas mixture leaner than the gas mixture of the theoretical air fuel ratio. Next, after the engine has been warmed up, only the compression stroke injection is executed in at least a low engine load condition with an intensive fuel lean condition (such as a combustion gas mixture of an air fuel ratio $\geq 30$). As a result, the combustion gas mixture is concentrated in the vicinity of the ignition plug 10 to enable the laminer combustion. Thus, the combustion stability can be obtained and the fuel consumption efficiency is improved due to the intensive lean condition. Even in the intensive fuel lean condition such as A/F $\geq 30$, the combustion stability is improved. Accordingly, it is possible to execute the EGR to reduce the emission of Nox.

Figure 10:
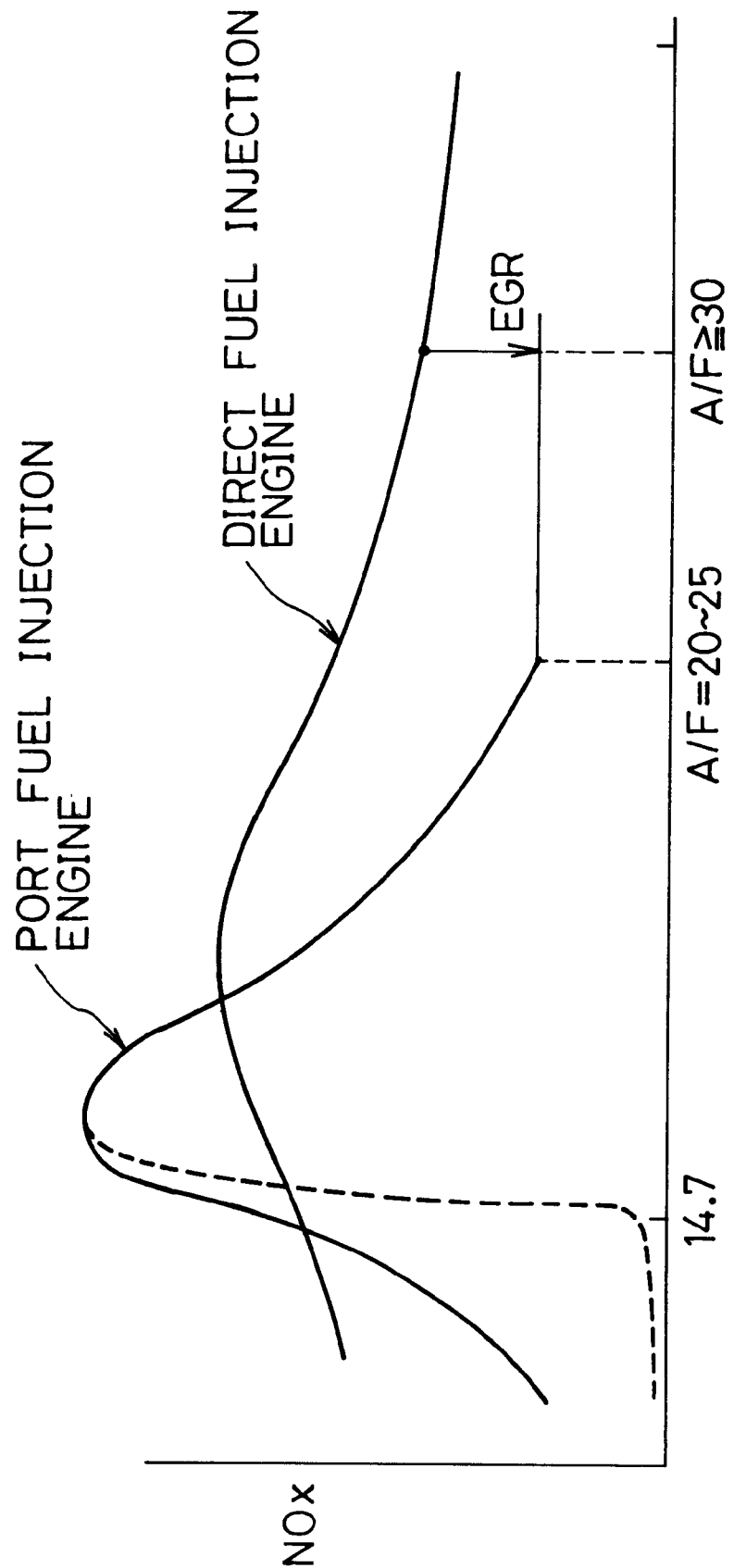
FIG. 10 is a graphical representation showing a relationship between the air fuel ratio and the NOx emission when the stratification combustion gas mixture condition is made by either the intake port injection engine and the direct injection engine.

Referring to FIG. 10, changes of the emission of NOx are shown by real lines for the port injection engine and direct injection engine with regard to the changes in the A/F of the combustion gas mixture. A broken line shows a change of the Nox emission after cleaning the exhaust gas by means of a three element catalyst in the port injection engine. In case of the port injection engine, the NOx emission is maximized at about A/F 16–17. As the combustion gas mixture becomes lean, the Nox emission is gradually reduced. In the port injection engine, the A/F about 20–25 is a lean limit. Beyond the limit, a proper engine combustion cannot obtained. On the other hand, although the NOx emission in the direct fuel injection engine is increased in a certain fuel lean range of A/F compared with the port injection engine, the lean limit is greatly raised. Even over the A/F=30, the EGR can be introduced so that the NOx emission can be reduced. In addition, the fuel consumption efficiency is improved due to the intensive fuel lean combustion gas mixture.

In the high engine speed and high engine load condition, the intake stroke injection is executed so as to accomplish a uniform combustion and the air fuel ratio is controlled to a fuel rich side to obtain a desirable engine output. In this case, if the catalytic device is disposed close to the engine body, it is necessary to supply an excessive amount of fuel to thereby make the combustion gas mixture overrich and to reduce the exhaust gas temperature by the latent vaporization heat of the excessive fuel in order to prevent the catalyst from overheating. As a result, the fuel consumption effiency is deteriorated. In view of this, in the illustrated embodiment, the A/F is maintained at a value providing a desirable engine output, such as A/F=13, or providing a fuel leaner combustion gas mixture than the value for the desirable engine output. In addition, the catalytic device 22 is provided in the half way of the exhaust pipe 16b downstream of the exhaust manifold 16a so as to keep away from the engine body as much as possible to thereby prevent the catalyst from overheating. Although it is disadvantageous for the warming up of the catalyst that the wi the catalitic device 22 is kept away from the engine body, the emission of HC and NOx is reduced by means of the separated injection during the cold condition of the catalyst.

Meanwhile, the control pattern of the direct injection engine is not limited to those disclosed in FIG. 5. For example, the intake stroke injection is executed just after the engine starting operation is completed so as to improve the atomization of the fuel. With this condition, the ignition timing is retarded. The separate injection may be executed in the cold condition of the catalyst but after the engine temperature is increased to a certain level.

In the above embodiment, the intake stroke injection is executed when the engine is still in the cold condition even after the warmed up condition of the catalyst. The separate injection may be made under such condition. Although this control makes the fuel consumption efficiency deteriorate a bit during the time period from the warmed up of the catalyst to the engine warmed up condition compared with the above embodiment, the warming up performance and the emission performance are improved. Since the catalyst has already been activated in the above time period, the emission of HC, Nox is improved. The separate injection would further improve the emission performance. If the separate injection is executed in the low engine load condition even after the engine warmed up condition, the emission of HC and Nox is further reduced.

Further, another injector may be provided in the intake port in addition to the injector 11. The fuel is injected through the injector in the intake port as well as the injector 11 in the later stage of the compression stroke in order to form the relatively fuel rich combustion gas mixture around the ignition plug compared with the gas mixture of the theoretical air fuel ratio and the relatively fuel lean combustion gas mixture compared with the gas mixture of the theoretical air fuel ratio beyond the area of the relatively fuel rich gas mixture like the illustrated embodiment. Alternatively, in order to form the relatively fuel rich combustion gas mixture around the ignition plug compared with the gas mixture of the theoretical air fuel ratio and the relatively fuel lean combustion gas mixture compared with the gas mixture of the theoretical air fuel ratio in an area beyond the area of the relatively fuel rich gas mixture, the following control can be made; (1) the fuel injection timing may be advanced in the compression stroke injection compared with the laminer combustion gas mixture condition; (2) the separate fuel injection may be performed in a manner that the fuel injection is made twice in the single compression stroke; (3) the fuel injection timing may be retarded in the intake stroke injection compared with a uniform combustion condition. The above controls of (1) and (2) is intended that the laminer condition is deformed to disperse the fuel rich gas mixture around the plug to form a leaner gas mixture than the laminer condition. On the other hand, the control of the above (3) is intended that the uniform condition of the gas mixture is changed to a stratification combustion gas mixture condition in which a fuel rich atmosphere is formed around the ignition plug.

Thus, the feature of the present invention is able to properly control a gradient concentration of the combustion gas mixture within the whole combustion chamber between the stratification combustion gas mixture condition in which the relatively fuel rich combustion gas mixture exists around the ignition plug compared with the gas mixture of the theoretical air fuel ratio and the relatively fuel lean combustion gas mixture compared with the gas mixture of the theoretical air fuel ratio exists beyond the area of the relatively fuel rich gas mixture and the uniform condition in which the substantially homogeneous combustion gas mixture exist across the whole combustion chamber 5 through the control of at least one of the fuel injection timing, injection pulse width and ignition timing.

A tumble may be formed in the combustion chamber 5 instead of forming the swirl as aforementioned.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A direct injection engine comprising:
   an injector for injecting a fuel directly into the combustion chamber,
   a catalyst provided in an exhaust gas passage for cleaning an exhaust gas,
   a temperature condition judging means for judging a temperature condition of the catalyst,
   a fuel supply means for forming a fuel rich combustion gas mixture around the ignition plug equivalent to or richer than a combustion has mixture having a theoretical air fuel ratio and a fuel lean combustion gas mixture leaner than the combustion gas mixture having the theoretical air fuel ratio in an area surround said area of the fuel rich combustion gas mixture by means of the injector just before an ignition timing so that the air fuel ratio of the combustion gas mixture in the combustion chamber is of substantially the theoretical one as a whole when the temperature of the catalyst is lower than an activation temperature based on the judgment of the temperature condition judging means.

2. A direct injection engine as recited in claim 1 wherein the fuel supply means is actuated to form the fuel rich combustion as mixture around the ignition plug equivalent to or richer than the combustion gas mixture having the theoretical air fuel ratio by injection the fuel from the injector in a compression stroke when the temperature of the catalyst is lower than an activation temperature based on the judgment of the temperature condition judging means and to form a fuel lean combustion gas mixture leaner than said combustion as mixture of the theoretical air fuel ratio in said area surround said area of the fuel rich combustion gas mixture another fuel supply which is executed at a timing before said fuel injection to the compression stroke.

3. A direct injection engine as recited in claim 2 wherein the fuel supply means executes a separate injection in which the fuel is injected from the injector directly into the combustion chamber in both an intake stroke and compression combustion stroke respectively.

4. A direct injection engine as recited in claim 1 wherein the temperature condition judging means infers the temperature of the catalyst based on an engine coolant temperature to determine that the temperature of the catalyst is lower than the activation temperature when the engine coolant temperature is lower than a predetermined value.

5. A direct injection engine as recited claim 1 wherein the fuel supply means is actuated to form the fuel rich combustion gas mixture around the ignition plug and a fuel lean combustion gas mixture in the area surrounding said area of the fuel rich combustion gas mixture after an engine starting operation is completed.

6. A direct injection engine comprising;
   an ignition plug projected into a combustion chamber,
   an injector for injecting a fuel directly into the combustion chamber,
   a catalyst provided in an exhaust gas passage for cleaning an exhaust gas,
   a temperature condition judging means for judging a temperature condition of the catalyst,
   a fuel supply means for forming a fuel rich combustion, as mixture around the ignition plug equivalent to or richer than a combustion gas mixture having a theoretical air fuel ratio and a fuel lean combustion, as mixture leaner than the combustion as mixture having the theoretical air fuel ratio in an area surrounding said area of the fuel rich combustion gas mixture by means of the injector just before an ignition timing so that the air fuel ratio of the combustion gas mixture in the combustion chamber is of substantially the theoretical one as a whole when the engine is in a cold condition.

7. A direct injection engine as recited in claim 6 wherein the fuel supply means is actuated to form the fuel rich combustion gas mixture around the ignition plug equivalent to or richer than the combustion gas mixture having the theoretical air fuel ratio by injecting the fuel from the injector in a compression stroke when the temperature of the catalyst is lower than an activation temperature based on the judgment of the temperature condition judging means and to form a fuel lean combustion gas mixture leaner than said combustion gas mixture of the theoretical air fuel ratio in said area surrounding said area of the fuel rich combustion gas mixture by another fuel supply which is executed at a timing before said fuel injection in the compression stroke.

8. A direct injection engine as recited in claim 7 wherein the fuel supply means executes a separate injection in which the fuel is injected from the injector directly into the combustion chamber in both an intake stroke and compression stroke respectively.

9. A direct injection engine as recited in claim 7 wherein it is determined that the engine is in the cold condition when an engine coolant temperature is lower than a predetermined value.

10. A direct injection engine as recited claim 6 wherein the fuel supply means is actuated to form the fuel rich combustion gas mixture around the ignition plug and a fuel lean combustion gas mixture in the area surrounding said area of the fuel rich combustion gas mixture after an engine starting operation is completed.

11. A direct injection engine comprising;
an ignition plug projected into a combustion chamber,
an injector for injecting a fuel directly into the combustion chamber,
a catalyst provided in an exhaust gas passage for cleaning an exhaust gas,
a temperature condition judging means for judging a temperature condition of the catalyst,
a fuel supply means for forming a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture by means of the injector when the temperature of the catalyst is lower than an activation temperature based on the judgment of the temperature condition judging means,
the fuel supply means being actuated to form the fuel rich combustion gas mixture around the ignition plug equivalent to or richer than the combustion gas mixture having the theoretical air fuel ratio by injecting the fuel from the injector in a compression stroke when the temperature of the catalyst is lower than an activation temperature based on the judgment of the temperature condition judging means and to form a fuel lean combustion gas mixture leaner than said combustion gas mixture of the theoretical air fuel ratio in said area surrounding said area of the fuel rich combustion gas mixture by another fuel supply, and,
a fuel injection rate being determined such that an injection fuel amount in the intake stroke is greater than that in the compression stroke.

12. A direct injection engine as recited claim 11 wherein the fuel supply means is actuated to form the fuel rich combustion gas mixture around the ignition plug and a fuel lean combustion gas mixture in the area surrounding said area of the fuel rich combustion gas mixture after an engine starting operation is completed.

13. A direct injection engine as recited in claim 11 wherein the fuel being injected from the injector directly into the combustion chamber in both an intake stroke and combustion stroke respectively.

14. A direct injection engine comprising;
an ignition plug projected into a combustion chamber,
an injector for injecting a fuel directly into the combustion chamber,
a catalyst provided in an exhaust gas passage for cleaning an exhaust gas,
a temperature condition judging means for judging a temperature condition of the catalyst,
a fuel supply means for forming a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture by means of the injector when the temperature of the catalyst is lower than an activation temperature based on the judgment of the temperature condition judging means,
the fuel supply means being actuated to form the fuel rich combustion gas mixture around the ignition plug equivalent to or richer than the combustion gas mixture having the theoretical air fuel ratio by injecting the fuel from the injector in a compression stroke when the temperature of the catalyst is lower than an activation temperature based on the judgment of the temperature condition judging means and to form a fuel lean combustion gas mixture leaner than said combustion gas mixture of the theoretical air fuel ratio in said area surrounding said area of the fuel rich combustion gas mixture by another fuel supply,
a fuel injection rate being determined such that an injection fuel amount in the intake stroke is greater than that in the compression stroke, and,
the injection rate of the fuel injection amount in the intake stroke is increased as an engine load is increased.

15. A direct injection engine as recited claim 14 wherein the fuel supply means is actuated to form the fuel rich combustion gas mixture around the ignition plug and a fuel lean combustion gas mixture in the area surrounding said area of the fuel rich combustion gas mixture after an engine starting operation is completed.

16. A direct injection engine comprising;
all ignition plug projected into a combustion chamber,
an injector for injecting a fuel directly into the combustion chamber,
a catalyst provided in an exhaust gas passage for cleaning an exhaust gas,
a temperature condition judging means for judging a temperature condition of the catalyst,
a fuel supply means for forming a fuel rich combustion gas mixture around the ignition plug equivalent to or richer than a combustion gas mixture having theoretical air fuel ratio including an excessive fuel not to be combusted at an initial combustion stage in the combustion chamber and a fuel lean combustion gas mixture layer that the combustion gas mixture having the theoretical air fuel ratio in an area surrounding said area of the fuel rich combustion gas mixture so as to reduce the combustion speed at a mean combustion stage following the initial combustion stage by means of the injector just before an ignition timing so that the air fuel ratio of the combustion gas mixture in the combustion chamber is of substantially the theoretical one as a whole when the temperature of the catalyst is lower than an activation temperature based on the judgment of the temperature condition judging means, whereby the excessive fuel is combusted in an late combustion stage following the main combustion stage.

17. A direct injection engine as recited in claim 16, wherein the fuel supply means is actuated to form the fuel rich combustion gas mixture around the ignition plug equivalent to or richer than the combustion gas mixture having the theoretical air fuel ratio by injecting the fuel from the injector in a compression stroke when the temperature of the catalyst is lower than activation temperature based on the judgment of the temperature condition judging means and to form a fuel lean combustion gas mixture leaner than said combustion gas mixture of the theoretical air fuel ratio in said area surrounding said area of the fuel rich combustion gas mixture by another fuel supply which is executed at a timing before said fuel injection in the compression stroke.

18. A direct injection engine as recited in claim 17 wherein the fuel supply means executes a separate injection in which the fuel is injected from the injector directly into the combustion chamber in both an intake stroke and compression stroke respectively.

19. A direct injection engine as recited in claim 18 wherein the temperature condition judging means infers the temperature of the catalyst based on an engine coolant temperature to determine that the temperature of the catalyst is lower than the activation temperature when the engine coolant temperature is lower than a predetermined value.

20. A direct injection engine as recited claim 16 wherein the fuel supply means is actuated to form the fuel rich combustion gas mixture around the ignition plug and a fuel lean combustion gas mixture in the area surrounding said area of the fuel rich combustion gas mixture after an engine starting operation is completed.

21. A direct injection engine comprising;

an ignition plug projected into a combustion chamber, an injector for injecting a fuel directly into the combustion chamber, a catalyst provided in an exhaust gas passage for cleaning an exhaust gas, a temperature sensor for detecting a coolant temperature condition of the catalyst, a control unit;

for receiving signals from the sensor to determine that the catalyst is lower than an activation temperature when the engine coolant temperature is lower than a predetermined value, for calculating a fuel injection timing and fuel injection amount from the injector to form a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture just before an ignition timing so that the air fuel ratio of the combustion as mixture in the combustion chamber is of substantially the theoretical one as a whole when it is determined that the temperature of the catalyst is lower than an activation temperature, and for producing signals to the injector to inject the fuel at the fuel injection timing.

22. A direct injection engine comprising;

an ignition plug projected into a combustion chamber, an injector for injecting a fuel directly into the combustion chamber, a catalyst provided in an exhaust gas passage for cleaning an exhaust gas, A temperature sensor for detecting a coolant temperature condition of the catalyst, a control unit;

for receiving signals from the sensor to determine that the catalyst is lower than an activating temperature when the engine coolant temperature is lower than a predetermined value, for calculating a first fuel injection timing in a compression stroke and first fuel injection amount from the injector to form a fuel rich combustion gas mixture around the ignition plug equivalent to or richer than a combustion gas mixture having a theoretical air fuel ratio and calculating a second fuel injection timing in an intake stroke and second fuel injection amount from the injector to form a fuel lean combustion gas mixture leaner than the combustion gas mixture having the theoretical air fuel ratio in an area surrounding said area of the fuel rich combustion gas mixture when it is determined that the temperature of the catalyst is lower than all activation temperature, and for producing signals to the injector to inject the fuel at the fuel injection timings respectively.

23. A direct injection engine as recited in claim 22 wherein a total amount of the first and second fuel injections provide a combustion gas mixture having the theoretical air fuel ratio in the combustion chamber as a whole.

24. A direct injection engine comprising;

an ignition plug projected into a combustion chamber an injector for injecting a fuel directly into the combustion chamber a catalyst provided in an exhaust gas passage for cleaning an exhaust gas, a temperature condition judging means for judging a temperature condition of the catalyst, a fuel supply means which executes a separate injection in which the fuel is injected from the injector directly into the combustion chamber in both an intake stroke and compression stroke respectively so as to form a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture by means of the injector just before an ignition timing when the temperature of the catalyst is lower than an activation temperature based on the judgment of the temperature condition judging means.

25. A direct injection engine as recited in claim 24 wherein a fuel injection rate is determined such that an injection fuel amount in the intake stroke is greater than that in the compression stroke.

26. A direct injection engine as recited in claim 24 wherein the fuel injection rate of the fuel injection amount in the intake stroke is increased as an engine load is increased.

27. A direct injection engine as recited in claim 24 further comprising an ignition timing control means for retarding the ignition timing from a base ignition timing when the separate injection is executed in the case where the catalyst is in a cold condition in which the catalyst temperature is lower than the activation temperature.

28. A direct injection engine as recited in claim 27 wherein the ignition timing is retarded in a very low engine load condition and in the cold condition of the catalyst, and wherein the separate injection is executed with an increased supply of an amount of air and fuel which is greater than those corresponding to an engine operating condition.

29. A direct injection engine as recited in claim 28 wherein the retardation of the ignition timing and the increased supply of the air and fuel is canceled when the engine load is increased from the very low engine load condition to a predetermined engine load condition.

30. A direct injection engine as recited in claim 27 wherein the retardation of the ignition timing is reduced when a running condition is established.

31. A direct injection engine as recited in claim 24 wherein the separate injection is executed where the catalyst is in a cold condition where the catalyst temperature is lower than the activation temperature, and wherein only an intake stroke injection is executed after the catalyst is warmed up.

32. A direct injection engine as recited in claim 31 wherein only a compression stroke injection is executed after the engine is warmed up.

33. A direct injection engine as recited in claim 24 wherein the separate injection is executed where the catalyst is in a cold condition where the catalyst temperature is lower than the activation temperature, and wherein only a compression stroke injection is executed after the catalyst is warmed up.

34. A direct injection engine as recited in claim 24 wherein the compression stroke injection is executed in a range of BTDC 50°–60° CA.

35. A direct injection engine as recited in claim 24 wherein the intake stroke injection is executed in a range of ATDC 70° 20° CA.

36. A direct injection engine as recited in claim 24 wherein a cavity of a concave configuration is formed on a top portion of a piston which partly define the combustion chamber so that an injected fuel through the compression stroke injection is reflected on the cavity surface to stay around the ignition plug.

37. A direct injection engine comprising;

an ignition plug projected into a combustion chamber, an injector for injecting a fuel directly into the combustion chamber, a catalyst provided in an exhaust gas passage for cleaning an exhaust gas, a temperature condition judging means for judging a temperature condition of the catalyst, a fuel supply means which executes a separate injection in which the fuel is injected from the injector directly into the combustion chamber in both an intake stroke and compression stroke respectively so as to form a fuel rich combustion gas mixture around the ignition plug equivalent to or richer than a combustion gas mixture having a theoretical air fuel ratio and a fuel lean combustion gas mixture leaner than the combustion gas mixture having the theoretical air fuel ratio in an area surrounding said area of the fuel rich combustion gas mixture by means of the injector just before an ignition timing when the engine is in a cold condition.

38. A direct injection engine comprising;

an ignition plug projected into a combustion chamber, an injector for injecting a fuel directly into the combustion chamber, a catalyst provided in an exhaust gas passage for cleaning an exhaust gas, a temperature condition judging means for judging a temperature condition of the catalyst, a fuel slipply means executes a separate injection in which the fuel is injected form the injector directly into the combustion chamber in both all intake stroke and combustion stroke respectively so as to form a fuel rich combustion gas mixture around the ignition plug equivalent to or richer than a combustion gas mixture having a theoretical air fuel ratio including an excessive fuel not to be combusted at an initial combustion stage in the combustion chamber and a fuel lean combustion gas mixture leaner than the combustion gas mixture having the theoretical air fuel ratio in an area surrounding said area of the fuel rich combustion gas mixture so as to reduce the combustion speed at a main combustion stage following the initial combustion stage by means of the injector just before an ignition timing when the temperature of the catalyst is lower than an activation temperature based on the judgment of the temperature condition judging means, whereby the excessive fuel is combusted in a late combustion stage following the main combustion stage.

* * * * *